Dec. 21, 1965   R. M. WELSH, JR   3,225,339
SYNCHRO TAKE-OFF DEVICE
Filed Dec. 31, 1963   2 Sheets-Sheet 1
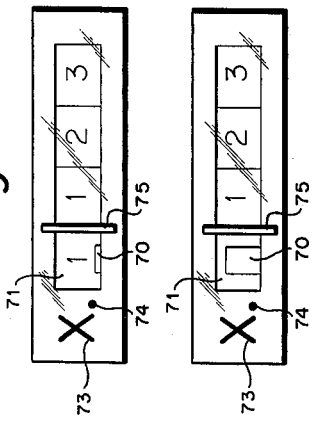
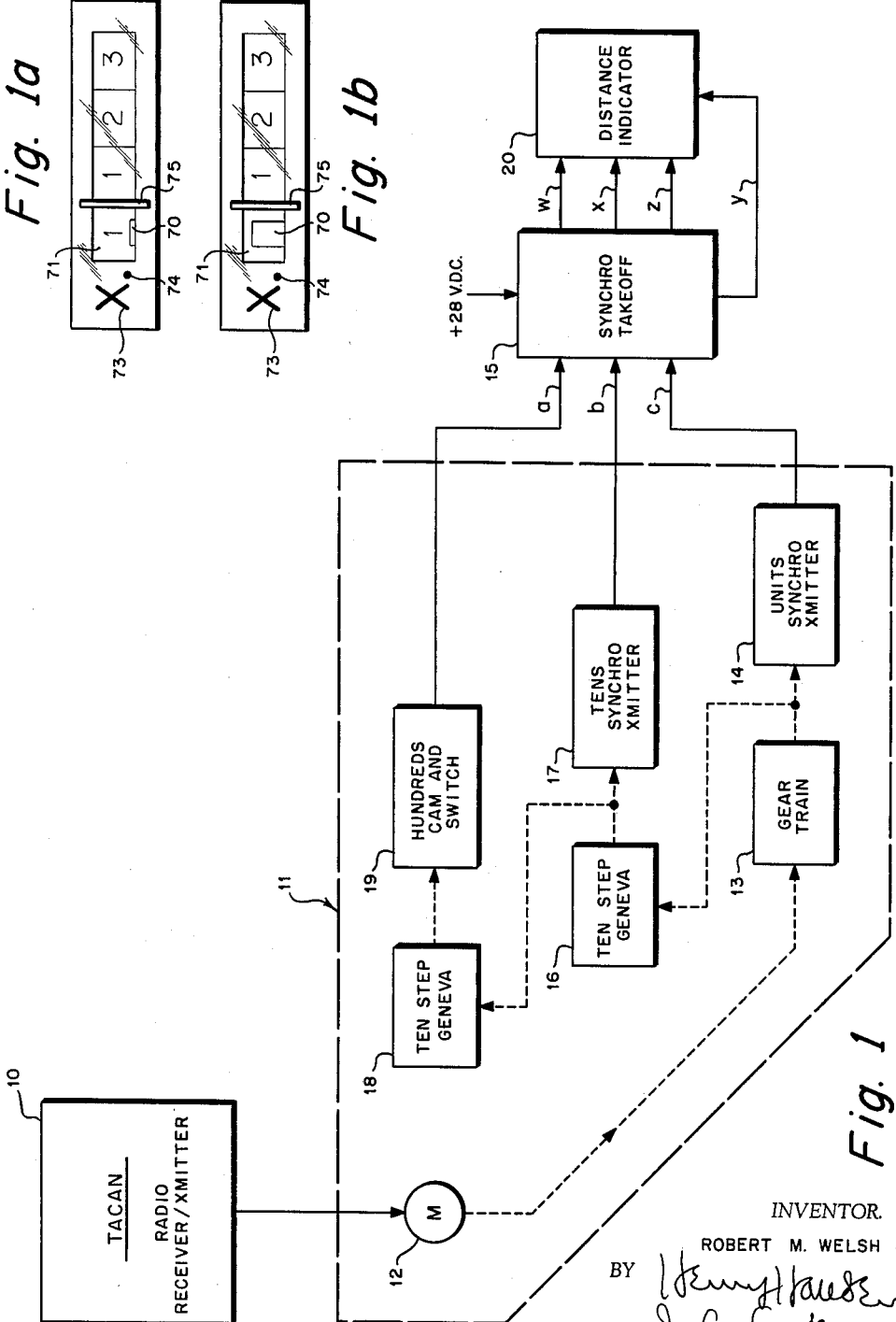
INVENTOR.
ROBERT M. WELSH JR.
BY
ATTORNEYS Dec. 21, 1965  R. M. WELSH, JR  3,225,339
SYNCHRO TAKE-OFF DEVICE
Filed Dec. 31, 1963  2 Sheets-Sheet 2

INVENTOR.
ROBERT M. WELSH, JR.
BY
ATTORNEYS

United States Patent Office 3,225,339
Patented Dec. 21, 1965

3,225,339
SYNCHRO TAKE-OFF DEVICE
Robert M. Welsh, Jr., 171 S. Clearview Ave.,
Langhorne, Pa.
Filed Dec. 31, 1963, Ser. No. 334,949
10 Claims. (Cl. 340—198)
(Granted under Title 35, U.S. Code (1952), sec. 266)

The invention disclosed herein may be manufactured and used by or for the Government of the United States of America for governmental purposes without the payment of any royalties thereon or therefor.

This invention relates to improvements in counter apparatus and more particularly concerns an improvement in the display readability of a synchro repeater-type TACAN range indicator.

The term "TACAN" has reference to a short range tactical airborne navigation system. An airborne navigation interrogator-responder such as radio set AN/ARN–21 is designed to operate in conjunction with a surface navigation beacon transponder such as radio set AN/URN–3 to comprise a radio navigation system which enables an equipped aircraft to obtain continuous indications of its distance and bearing from any selected beacon station located within the line of sight distance from the aircraft up to 195 nautical miles.

Used in conjunction with the above noted TACAN equipment is an indicator coupler such as coupler CU–395/ARN–21A which is designed to function as a central data unit to provide precision distance and bearing information to navigational units now in use or in the stage of development that may have need for this information. Such devices as navigational computers, combined bearing-distance instruments, and automatic pilots can be designed to utilize the 400-c.p.s. data readily available from the coupler.

The coupler when interconnected with the radio receiver-transmitter unit of the TACAN equipment and with components supporting the required signal and control voltages performs the function of automatically and continuously supplying required information concerning the distance of the radio receiver-transmitter from a navigational beacon station to a range indicator such as ID–388/APN or ID–663 U.

The indicator coupler CU–395/ARN–21A includes a distance motor-generator receiving the distance information from the distance circuits of a TACAN equipment as an input. The motor portion of the motor-generator is the driving force, operating a distance gear train. The generator output is proportional to the rate of change of distance and is fed back to a servo amplifier to stabilize operation.

The distance gear train drives the rotor of a units synchro transmitter. The units synchro transmitter converts the mechanical rotation of the rotor into an equivalent electrical signal in the stator windings. This electrical signal in the stator windings is coupled to the stator windings of a synchro receiver in a range indicator such as Range Indicator ID–388/APN or other synchro-type distance indicator. The distance gear train also drives a geneva mechanism which produces an output shaft rotation of 1/10 turn (36°) for each complete revolution of the input shaft. The output shaft of this first geneva mechanism drives the rotor of a tens transmitter. The rotor shaft rotation of the tens transmitter is coupled from the coupler in exactly the same manner as described for the units transmitter above. A second output from the first geneva mechanism is used as the input shaft rotation of a second geneva mechanism. The operation is exactly the same as described above for the first geneva mechanism, the output shaft turning one 360° rotation of the input shaft. The output of the second geneva mechanism is used to operate a cam and switch which controls the signal applied to the hundreds receiver in the range indicator. For more detailed information concerning this coupler reference may be made to the Handbook Service Instructions, Iindicator Coupler CU–395/ARN–21A, NAVEAR 16–35CU395–501, dated May 15, 1961.

The range accuracy of all high quality TACAN sets is specified as 0.1 mile plus 0.2% of the range to be indicated. Present synchro repeater type range indicators display range (in nautical miles) in a three digit readout: hundreds, tens and units. The units display drum, which is analog since it is continuously moving, is usually graduated in increments of 0.5 mile. In order for a pilot to read within 1/10 of a mile, the accuracy to which the TACAN equipment has been designed, the pilot must interpolate to 1/5 of a 0.5 mile increment. This is difficult to do and does not provide any required superiority of dial readability over equipment performance accuracy. In other words, there arises a situation wherein the TACAN sets have a high internal accuracy unmatched by the external dial readibility.

An object of this invention is to provide a synchro take-off device which will obtain dial readability of range indicators equal to or greater than the required efficiency of the remaining system.

Another object of this invention is to provide circuitry to enable direct visual readout of an indicator within the established accuracy of the input information.

A further object of the present invention is to provide a means for accurately reading the scale increment of 1/10 of that presently attainable in range indicators.

Still another object of the present invention is to provide a means for permitting the units displayed on the conventional counter to indicate by digital readout tenths of a mile and further to provide a flag for indicating whether the right hand digit of the counter represents miles or tenths of a mile.

A still further object of the invention is to provide 0.1 mile digit synchro output in analog form and TACAN 1.0 mile digit synchro output in digital form for use in computers or for display on synchro repeater type indicators.

An additional object of the invention is to provide circuitry for permitting the units displayed on the conventional counter to indicate tenths of a mile by direct digital and hundredths of a mile by interpolation.

Other objects and advantages will be apparent from the following description of an embodiment of the invention and the novel features thereof will be particularly pointed out hereinafter in connection with the appended claims.

In the accompanying drawing:

FIG. 1 is a simplified block diagram of a TACAN system utilizing the present invention;

FIG. 1a illustrates a representation of the counter readout at less than 100 miles;

FIG. 1b illustrates a representation of the counter readout at greater than 100 miles;

Figure 2:
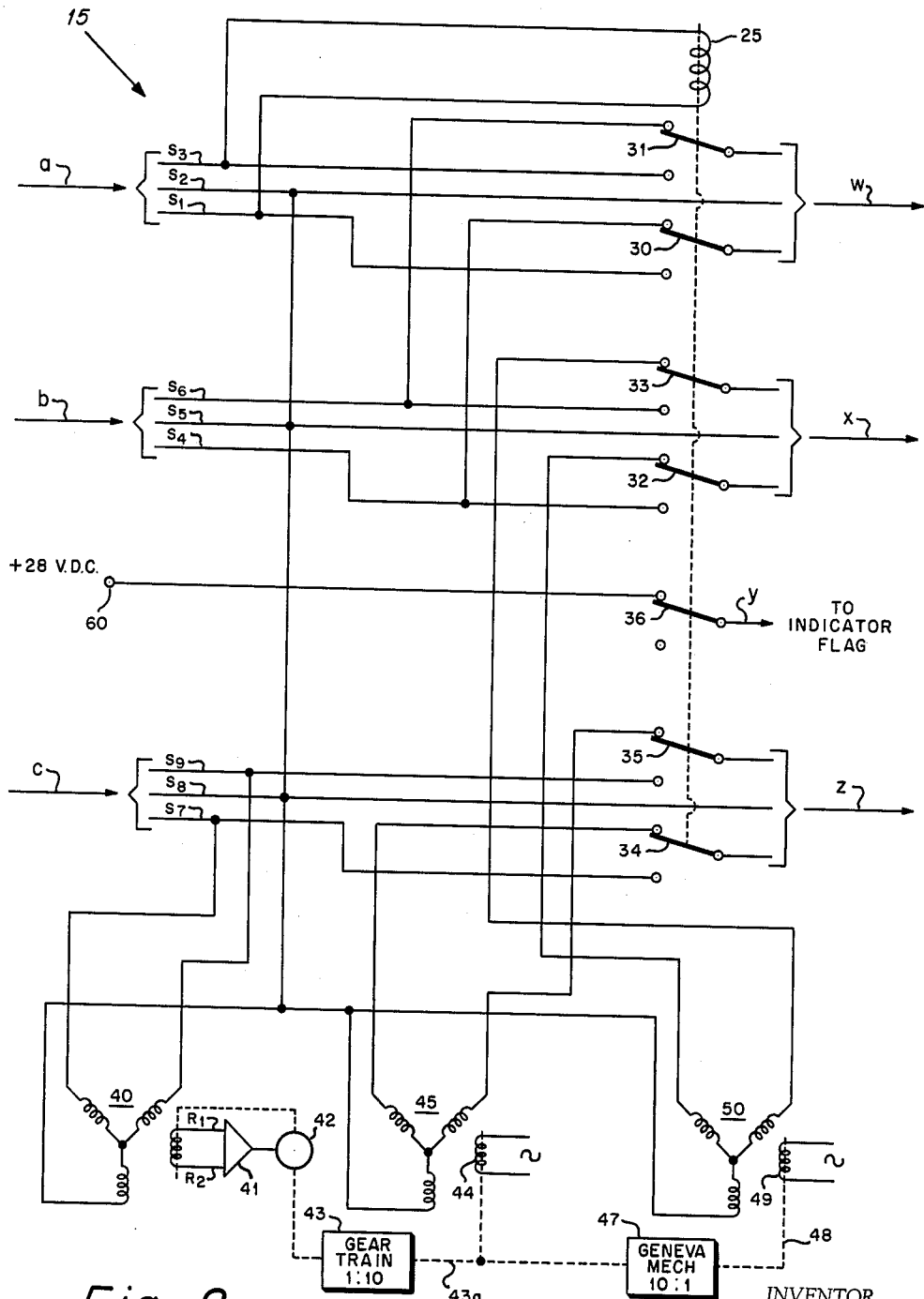
FIG. 2 is a schematic block diagram in greater detail of the synchro take-off device of FIG. 1.

By reference to FIG. 1 a brief, general description of the operation of the TACAN set and TACAN coupler will be given. The basic TACAN system comprises an airborne AN/ARN–21A transmitter-receiver or equivalent and an AN/URN–3 ground beacon or equivalent neither shown. To obtain range and bearing information with respect to a selected ground beacon, the airborne equipment interrogates the selected ground beacon with pulses spaced at a predetermined time interval, for example, 12 microseconds. The ground beacon transponds with 12 microsecond spaced pulse pairs. In the TACAN system, range information is obtained utilizing circuitry in the airborne equipment which functions to measure the time period which elapses between transmission of an interrogating pulse pair and receipt of a reply pulse pair.

The AN/ARN-21 transmitter initiates the interrogation process by radiating pulse signals. These signals, known as distance interrogation pulses, are detected by the AN/URN-3 receiver and cause the AN/URN-3 transmitter to respond with pulses known as distance reply pulses. The distance reply pulses are detected by the receiver portion of the RT-220/ARN-21, indicated generally at 10, where special range circuits measure the elapsed time between transmission of the interrogation pulses and the reception of the reply pulses. Other range circuits then convert the time difference into nautical miles which are subsequently displayed on a range or distance indicator 20. For more detailed information, reference may be made, for example, to the Handbook Service Instructions, Radio Set AN/ARN-21, (Navy) AN 16-30 ARN21-2, (USAF) T.O. 12R5-2ARN21-2, dated May 1, 1956 (revised January 15, 1958). With respect to the distance indicator 20, it should be noted that any standard synchro repeater type range indicator having synchro receivers may be utilized. One such indicator known and used in the art is the ID 663/U more fully described in Handbook of Overhaul Instructions, BDHI Type ID 663/U, NAVAER 16-35-ID 663-1, dated Nov. 15, 1960.

The distance circuits of the radio receiver-transmitter 10 of the TACAN system provide the output thereof to the TACAN coupler 11 which may be one of any of the various couplers commonly known and utilized, one such device being the CU-395/ARN-21A coupler. Coupler 11 includes, among other circuitry, a distance motor-generator 12 which receives a control voltage from the distance circuits of the radio receiver-transmitter 10 and drives a gear train 13 of the distance system. The amount that the distance motor has turned the gear train 13 from a zero position is proportional to the distance that the aircraft is presently located with respect to the beacon station. The gear train 13 drives a rotor of the units synchro transmitter 14, the units synchro transmitter in turn converting the mechanical rotation of the rotor into an equivalent electrical signal in the stator windings thereof. This electrical signal in the stator windings is coupled to the appropriate stator windings of a synchro receiver located within the range indicator 20 through the synchro take-off 15 of the present invention. This synchro take-off 15 will be described more clearly below with reference to FIG. 2.

The distance gear train 13 also drives a ten step geneva mechanism 16 which produces an output shaft rotation of $\frac{1}{10}$ turn (36°) for each complete revolution of the input shaft. The output shaft from this geneva mechanism 16 drives the rotor of the tens synchro transmitter 17. The rotor shaft rotation of the tens transmitter 17 is coupled to the distance indicator 20 through the synchro take-off 15 in exactly the same manner as described for the units transmitter 14 above. A second output from the first geneva mechanism 16 is used as the input shaft rotation of a second ten step geneva mechanism 18. The operation is exactly the same as described above for the first geneva mechanism, the output shaft turning one 36° step for each 360° rotation of the input shaft. The output of the second geneva mechanism is used to operate a cam and switch 19 which controls the signal applied through synchro take-off 15 to the hundreds receiver in the range indicator 20. Although not shown, the hundreds switch is activated by a cam follower which closes the switch when the cam follower rides up on the high portion of the cam. The cam then has five switch activating positions and five interspaced deactivating positions. Thus, as the distance mechanism searches from 0 through 200 miles, the hundreds switch is repeatedly open from 0 through 99 miles and closed through 100-199 miles, then opened again as the searching repeats. The switch subsequently controls voltages on the stator of the hundreds synchro receiver in the distance indicator 20 for presenting dial readings of either 0 or 1. In other words, each 360-degree revolution of the tens transmitter rotor positions a cam through the second ten-step geneva mechanism such that a switch selects one or the other of two 400-c.p.s. voltages corresponding to two angular positions of a synchro transmitter. This provides a synthetic transmitter output corresponding to two transmitter positions, one in the 0-to-99-mile portion of the range, and the other in the 100-to-199-mile portion of the range.

As illustrated in FIG. 2, the electrical signals in the stator windings of transmitters 14, 17 and 19 of coupler 11 are coupled to the stator windings of a synchro receiver in the distance indicator 20 through a synchro take-off indicated generally at 15. A relay 25 is applied across the output $S_1$ and $S_3$ of the hundreds miles digit synchro of the coupler 11. This relay 25 actuates switches 30 through 36 between a high-range reading or activated position and low-range reading or deactivated positions, the low-range reading position being illustrated in FIG. 2. At indicated ranges of 100 miles and greater, there is a definite potential difference between $S_1$ and $S_3$ of the hundreds synchro transmitter of the TACAN coupler 11. The relay 25 is activated by this potential difference and the three digit TACAN coupler synchro output signals are connected directly through device 15, unaltered, to the respective stator windings of a synchro receiver in the distance indicator 20.

When the indicated ranges are from zero to 99.9 miles, the potential difference is zero between $S_1$ and $S_3$ of the hundreds miles digit synchro of the coupler and the relay 25 is deactivated. FIG. 2 illustrates the switch positions in the deactivated or low-range reading position and it is seen that the hundreds miles digit synchro signals are disconnected and precluded from passing through to the distance indicator but remain connected to the relay coil. In this deactivated position the voltage signals $S_4$ and $S_6$ of the tens miles digit synchro of the coupler are precluded from passing directly through to the stator windings of the tens synchro receiver in the distance indicator 20 and instead are switched through switches 30 and 31 to what would normally be the hundreds miles synchro receiver of the indicator 20.

The voltage signals $S_7$ and $S_9$ of the units synchro transmitter are similarly precluded from passing directly through to the associated stator windings of the synchro receiver in the distance indicator 20 by reason of the position of switches 34 and 35. However, the synchro signals from the units synchro transmitter are applied and remain connected to the stator winding of a control transformer 40.

The stator of the units synchro transmitter of coupler 11 supplies a primary voltage to the stator of a control transformer 40 and the stator coils in the transformer induce a secondary voltage in the transformer's motor windings. This secondary voltage is transmitted over the $R_1$ and $R_2$ leads to the amplifier 41. Thus, the units synchro transmitter 19 supplies a signal to the transformer and the transformer in turn operates the amplifier.

The amplifier 41 controls a motor generator 42 which in turn drives a gear train 43 having a 1:10 ratio in addition to driving the rotor shaft of the control transformer.

The gear train 43 is mechanically coupled through output shaft 43a to a rotor 44. This rotor 44 is driven from a 400 cycle, 26 volt power source and is part of a $\frac{1}{10}$ mile digit synchro transmitter 45 which has the stator windings thereof coupled through switches 34 and 35 to the stator windings of a miles synchro receiver in distance indicator 20. The $\frac{1}{10}$ mile synchro transmitter 45 is driven from the gear train 43 in such fashion that the shaft of the synchro transmitter will rotate once for each 1/10 revolution (36°) of the shaft of the control transformer. The gear train 43 also drives a geneva mechanism 47 having a 10:1 ratio and operates in such fashion that for each revolution of the output shaft 43a of the gear train 43 the output of geneva mechanism 47 rotates a rotor shaft 48 1/10 of a revolution. Rotor shaft 48 is a part of a miles digit synchro transmitter 50 having its rotor coils 49 supplied with a 400 cycle, 28 volt alternating current power source and having the stator windings supplying a voltage through switches 32 and 33 to the stator windings in the tens miles synchro receiver in the distance indicator 20. It should be noted that since the rotation of the rotor shaft 48 by the geneva mechanism 47 is digital, the output of the miles synchro transmitter 50 coupled to it is also digital. It is therefore seen that the digital output of the miles digit synchro transmitter 50 is connected to what would normally be the tens miles digit synchro receiver and that the analog output of the 1/10 mile synchro transmitter 45 is connected to what would normally be units (miles) digit synchro receiver of the indicator 20.

In order for the indicator 20 to include a convenient means of informing the pilot or viewer whether the right hand digit represents miles or 1/10 mile, a 28 volt D.C. source is applied to terminal 60 and through switch 36 is utilized as a switch source to provide power for a solenoid or motor not shown which is used to actuate the required decimal point bearing flag in the indicator in the appropriate manner known to those having ordinary skill in the art. As illustrated in FIG. 2, the device is operating within the range of zero to 99.9 miles and the switch 36 is in the deactivated position thereby allowing the 28 volt D.C. source to provide power to switch the decimal point flag to the sight position. When the switch 36 is in the activated position, the 28 volt power source is not applied to the decimal point flag switch of the distance indicator 20 and therefore no decimal point is seen.

Referring now to FIGS. 1a and 1b and to the situation where no decimal point flag is provided in an indicator and where the indicator does contain a flag such as flag 70 which normally be a thousands mile digit position shown at 71, the glass window of the display can be provided with tape markings such as the X at 73 and decimal point at 74 to the left of the thousand miles digit display.

When the TACAN is operating within the zero to 99.9 miles indication of range the switch 36 would be in the deactivated position thereby providing a source of power from the 28 volt source applied at 60 to remove the flag 70 from its normal flag-up position to a flag-down position shown at FIG. 1a. By reference to the X-decimal point-tenths indication to the left of the strip 75 provided vertically between the hundreds and thousands miles digit it would suggest to the viewer that the right side would be indicating a number-decimal point-tenths-reading, in this case, a 12.3 miles reading. When the TACAN is operating in the 100 mile and greater range the switch 36 is in the activated position and no power is applied to remove the flag 70 from its normal flag-up position blanking the numeral in the thousands miles digit display. By the viewer's reference again to the left of the vertical marker it would appear that the X-decimal point reading would suggest that the right side of the vertical marker was reading 123 miles.

It will be understood that various changes in the details, materials, steps and arrangements of parts, which have been herein described and illustrated in order to explain the nature of the invention, may be made by those skilled in the art within the principle and scope of the invention as expressed in the appended claims.

What is claimed is:

1. In a range indicating system the combination comprising:

first, second and third transmitting synchros each including a rotor and a stator, corresponding first, second and third receiving synchros each including a rotor and a stator, relays means electrically connected to said third transmitting synchro and operable to move a series of switches between an activated and a deactivated position, said switches when in the activated position electrically connecting each transmitting synchro to the corresponding receiving synchro, said first transmitting synchro electrically connected to a control transformer including a rotor and a stator, amplifier means operated by said control transformer, motor means controlled by said amplifier means and driving a gear train, said gear train mechanically coupled to the rotor of a fourth synchro transmitter, said synchro transmitter having the stator thereof electrically connected to said first receiving synchro when said switches are in the deactivated position, a geneva mechanism coupled to and driven by said gear train, a fifth synchro transmitter including a rotor and a stator having the rotor thereof mechanically coupled to said geneva mechanism and having the stater thereof electrically connected to said second receiving synchro when said switches are in the deactivated position, and said stator of said second transmitting synchro being electrically connected to said third receiving synchro when said switches are in the deactivated position.

2. In a range indicating system the combination comprising:

first, second and third transmitting synchros each including a rotor and a stator, corresponding first, second and third receiving synchros each including a rotor and a stator, switch means electrically coupled to said third transmitting synchro and movable between an activated and a deactivated position, said switches when in the activated position electrically connecting each of said transmitting synchros to the corresponding receiving synchros, said first transmitting synchro electrically connected to a control transformer including a rotor and a stator, amplifier means operated by said control transformer, motor means controlled by said amplifier means and driving a gear train, said gear train mechanically coupled to a fourth synchro transmitter, said transmitter being electrically conjoined to said first receiving synchro when said switches are in the deactivated position, a geneva mechanism coupled to and driven by said gear train, a fifth synchro transmitter mechanically coupled to said geneva mechanism and electrically connected to said second receiving synchro when said switches are in the deactivated position, and said stator of said second transmitting synchro being electrically connected to said third receiving synchro when said switches are in the deactivated position.

3. In a range indicating system the combination comprising:

units digit, tens digit, and hundreds digit transmitting synchros each including a rotor and a stator, corresponding units, tens and hundreds digit receiving synchros each including a rotor and a stator, relay means electrically connected to said hundreds digit transmitting synchro and operable to move a series of switches between an activated and a deactivated position, said switches when in the activated position electrically connecting each of said transmitting synchros to the corresponding receiving synchro, said units digit transmitting synchro electrically coupled to the stator of a control transformer including a rotor and a stator, amplifier means operated by said control transformer, motor means controlled by said amplifier means and driving a gear train, said gear train mechanically coupled to the rotor of a fourth synchro transmitter, said synchro transmitter having the stator thereof electrically connected to said units receiving synchro when said switches are in the deactivated position, a geneva mechanism coupled to and driven by said gear train, a fifth synchro transmitter including a rotor and a stator having the rotor thereof mechanically coupled to said geneva mechanism and having the stator thereof electrically connected to said tens digit receiving synchro when said switches are in the deactivated position, and said stator of said tens digit transmitting synchro being electrically connected to said hundreds digit receiving synchro when said switches are in the deactivated position.

4. The range indicating system of claim 3 wherein:

said gear train driven by said motor means has a 1:10 gear ratio, and said geneva mechanism driven by said gear train has a 10:1 ratio.

5. The range indicating system of claim 4 wherein:

means are connected through said switches to position a decimal point flag when said switches are in the deactivated position.

6. In a range indicating system the combination comprising:

first, second and third transmitting synchros each including a rotor and a stator, corresponding first, second and third receiving synchros each including a rotor and a stator, switch means electrically coupled to said third transmitting synchro and movable between an activated and a deactivated position, said switches when in the activated position electrically connecting each of said transmitting synchros to the corresponding receiving synchros, said first transmitting synchro electrically connected to a control transformer including a rotor and a stator, amplifier means operated by said control transformer, motor means controlled by said amplifier means and driving a first mechanical means for providing an analog output at a rate greater than the input rate from said motor means, said first means mechanically coupled to a fourth synchro transmitter, said transmitter being electrically conjoined to said first receiving synchro when said switches are in the deactivated position, second means coupled to and driven by said first means for providing an output in digital format at a rate less than the input rate from said first means, a fifth synchro transmitter mechanically coupled to said second means and electrically connected to said second receiving synchro when said switches are in the deactivated position, and said stator of said second transmitting synchro being electrically connected to said third receiving synchro when said switches are in the deactivated position.

7. In a range indicating system the combination comprising:

units digit, tens digit, and hundreds digit transmitting synchros each including a rotor and a stator, corresponding units, tens and hundreds digit receiving synchros each including a rotor and a stator, relay means electrically connected to said hundreds digit transmitting synchro and operable to move a series of switches between an activated and a deactivated position, said switches when in the activated position electrically connecting each of said transmitting synchros to the corresponding receiving synchro, said units digit transmitting synchro electrically coupled to the stator of a control transformer including a rotor and a stator, amplifier means operated by said control transformer, motor means controlled by said amplifier means and driving a first mechanical means for providing an analog output at a rate ten times greater than the input rate from said motor means, said first means mechanically coupled to a one-tenth digit synchro transmitter, said transmitter being electrically conjoined to said units digit receiving synchro when said switches are in the deactivated position, second mechanical means coupled to and driven by said first means for providing an output in digital format at a rate ten times less than the input rate from said first means, an additional synchro transmitter mechanically coupled to said second means and electrically connected to said tens digit receiving synchro for supplying units information thereto when said switches are in the deactivated position, and said stator of said second transmitting synchro being electrically connected to said third receiving synchro when said switches are in the deactivated position.

8. The range indicating system of claim 7 wherein:

means are connected through said switches to position a decimal point flag when said switches are in the deactivated position.

9. In a range indicating system wherein first, second and third transmitting synchros each including a rotor and a stator supply voltage signals to corresponding first, second and third receiving synchros each of which also include a rotor and a stator, the combination comprising:

relay means electrically connected to one of said transmitting synchros and operable to move a series of switches between an activated and a deactivated position, said switches when in the activated position electrically connecting each transmitting synchro to the corresponding receiving synchro, control transformer means including a rotor and a stator formed for electrical connection with the first transmitting synchro, amplifier means operated by said control transformer, motor means controlled by said amplifier means and driving a gear train, said gear train mechanically coupled to the rotor of a fourth synchro transmitter, said fourth synchro transmitter having the stator thereof formed for electrical connection to the first receiving synchro when said switches are in the deactivated position, a geneva mechanism coupled to and driven by said gear train, a fifth synchro transmitter including a rotor and a stator having the rotor thereof mechanically coupled to said geneva mechanism and having the stator thereof formed for electrical connection to the second receiving synchro when said switches are in the deactivated position, and said switches when in the deactivated position formed to electrically connect the stator of the second transmitting synchro to the third receiving synchro.

10. In a range indicating system wherein units digit, tens digit and hundreds digit transmitting synchros each including a rotor and a stator supply voltage signals to corresponding units digit, tens digit and hundreds digit receiving synchros each of which also includes a rotor and a stator, the combination comprising:

relay means formed for electrical connection to the hundreds digit transmitting synchro and operable to move a series of switches between an activated and a deactivated position, said switches when in the activated position electrically connecting each of the transmitting synchros to the corresponding receiving synchro, control transformer means including a rotor and a stator formed for electrical connection with the units transmitting synchro, amplifier means operated by said control transformer, motor means controlled by said amplifier means and driving a gear train, said gear train mechanically coupled to the rotor of a fourth synchro transmitter, said fourth synchro transmitter having the stator thereof formed for electrical connection to the units digit receiving synchro when said switches are in the deactivated position, a geneva mechanism coupled to and driven by said gear train, a fifth synchro transmitter including a rotor and a stator having the rotor thereof mechanically coupled to said geneva mechanism and having the stator thereof formed for electrical connection to the tens digit receiving synchro when said switches are in the deactivated position, and said switches when in the deactivated position formed to electrically connect the stator of the tens digit transmitting synchro to the hundreds digit receiving synchro.

No references cited.

NEIL C. READ, *Primary Examiner.*